US009514381B1

United States Patent
Ludwigsen et al.

(10) Patent No.: US 9,514,381 B1
(45) Date of Patent: Dec. 6, 2016

(54) METHOD OF IDENTIFYING AND REPLACING AN OBJECT OR AREA IN A DIGITAL IMAGE WITH ANOTHER OBJECT OR AREA

(71) Applicant: Pandoodle Corporation, Lexington, SC (US)

(72) Inventors: David M. Ludwigsen, Columbia, SC (US); Dirk Dewar Brown, Columbia, SC (US); Robert John Glassett, Fair Lawn, NJ (US); Jason Griffith, Brighton, CO (US); Mark Bradshaw, Weston, FL (US)

(73) Assignee: Pandoodle Corporation, Lexington, SC (US)

( * ) Notice: Subject to any disclaimer, the term of this patent is extended or adjusted under 35 U.S.C. 154(b) by 0 days.

(21) Appl. No.: 14/209,361

(22) Filed: Mar. 13, 2014

Related U.S. Application Data

(60) Provisional application No. 61/800,774, filed on Mar. 15, 2013.

(51) Int. Cl.
*G06K 9/00* (2006.01)
*G06K 9/46* (2006.01)
*G06T 1/00* (2006.01)

(52) U.S. Cl.
CPC ............. *G06K 9/46* (2013.01); *G06K 9/00624* (2013.01); *G06T 1/00* (2013.01); *G06K 2009/4666* (2013.01)

(58) Field of Classification Search
CPC .................. G06K 9/46; G06K 9/00624; G06K 2009/4666; G06T 1/00
USPC .......................................................... 382/103
See application file for complete search history.

(56) References Cited

U.S. PATENT DOCUMENTS

| | | |
|---|---|---|
| 4,541,115 A | 9/1985 | Werth |
| 4,954,912 A | 9/1990 | MacDonald et al. |
| 5,353,392 A | 10/1994 | Luquet et al. |
| 5,436,672 A | 7/1995 | Medioni et al. |
| 5,543,856 A | 8/1996 | Rosser et al. |
| 5,623,587 A | 4/1997 | Bulman |
| 5,627,915 A | 5/1997 | Rosser et al. |
| 5,731,846 A | 3/1998 | Kreitman et al. |
| 5,745,379 A | 4/1998 | Lewis |

(Continued)

FOREIGN PATENT DOCUMENTS

| | | |
|---|---|---|
| WO | 2012167365 | 12/2012 |
| WO | 2013170362 | 11/2013 |

OTHER PUBLICATIONS

Mei, Tao, Hua, Xian-Sheng, Li,Shipeng. "Contextual In-Image Advertising". Proceedings of the 16th ACM International Conference on Multimedia.*

(Continued)

*Primary Examiner* — Kim Vu
*Assistant Examiner* — Molly Delaney
(74) *Attorney, Agent, or Firm* — Van Pelt, Yi & James LLP

(57) ABSTRACT

A system and method for object and area detection and replacement in an image includes identifying an object or area in one or more sequential images that form a moving image sequence and replacing some or all of the identified object or areas with another image such that the image looks to be part of the original composition of the original image including lighting, shadows, placement, occlusion, orientation, position, and deformation.

24 Claims, 13 Drawing Sheets

(56) References Cited

U.S. PATENT DOCUMENTS

| | | | |
|---|---|---|---|
| 5,808,695 A | 9/1998 | Rosser et al. |
| 5,892,554 A | 4/1999 | DiCicco et al. |
| 5,900,905 A | 5/1999 | Shoff et al. |
| 5,903,317 A | 5/1999 | Sharir et al. |
| 6,078,328 A | 6/2000 | Schumann et al. |
| 6,100,925 A | 8/2000 | Rosser et al. |
| 6,181,345 B1 | 1/2001 | Richard |
| 6,208,386 B1 | 3/2001 | Wilf et al. |
| 6,226,015 B1 | 5/2001 | Danneels et al. |
| 6,229,550 B1 | 5/2001 | Gloudemans et al. |
| 6,351,265 B1 | 2/2002 | Bulman |
| 6,463,205 B1 | 10/2002 | Aschbrenner et al. |
| 6,525,780 B1 | 2/2003 | Bruno et al. |
| 6,529,613 B1 | 3/2003 | Astle |
| 6,677,967 B2 | 1/2004 | Sawano et al. |
| 6,724,915 B1 | 4/2004 | Toklu et al. |
| 6,741,725 B2 | 5/2004 | Astle |
| 6,750,919 B1 | 6/2004 | Rosser |
| 6,924,832 B1 | 8/2005 | Shiffer et al. |
| 6,944,331 B2 | 9/2005 | Schmidt et al. |
| 7,015,978 B2 | 3/2006 | Jeffers et al. |
| 7,098,920 B2 | 8/2006 | Marschner et al. |
| 7,206,434 B2 | 4/2007 | Overton et al. |
| 7,230,653 B1 | 6/2007 | Overton et al. |
| 7,334,249 B1 | 2/2008 | Byers |
| 7,444,659 B2 | 10/2008 | Lemmons |
| 7,460,731 B2 * | 12/2008 | Senftner et al. | 382/284 |
| 7,474,698 B2 | 1/2009 | Pan et al. |
| 7,689,062 B2 | 3/2010 | Baharav et al. |
| 7,827,488 B2 | 11/2010 | Sitrick |
| 7,974,493 B2 | 7/2011 | Senftner et al. |
| 7,994,930 B2 | 8/2011 | Gajdos et al. |
| 8,060,407 B1 | 11/2011 | Delker et al. |
| 8,077,179 B2 | 12/2011 | Ludwigsen |
| 8,477,246 B2 | 7/2013 | Saxena et al. |
| 8,538,083 B1 | 9/2013 | Medioni et al. |
| 8,560,453 B2 | 10/2013 | Pendakur et al. |
| 8,744,242 B2 | 6/2014 | Braun et al. |
| 8,761,580 B2 | 6/2014 | Gausereide |
| 2003/0028432 A1 | 2/2003 | Troyansky et al. |
| 2008/0046920 A1 * | 2/2008 | Bill | 725/34 |
| 2008/0126226 A1 | 5/2008 | Popkiewicz et al. |
| 2008/0304805 A1 * | 12/2008 | Baharav et al. | 386/4 |
| 2009/0063279 A1 * | 3/2009 | Ives et al. | 705/14 |
| 2009/0116754 A1 * | 5/2009 | Samboursky et al. | 382/219 |
| 2009/0300480 A1 | 12/2009 | Cohen et al. |
| 2011/0119058 A1 | 5/2011 | Berard et al. |
| 2011/0170772 A1 | 7/2011 | Dharssi |
| 2011/0188836 A1 * | 8/2011 | Popkiewicz et al. | 386/278 |
| 2011/0267538 A1 | 11/2011 | Dharssi |
| 2011/0273619 A1 * | 11/2011 | Kamei | 348/584 |
| 2012/0303466 A1 | 11/2012 | Boskovich |
| 2013/0035996 A1 | 2/2013 | Frey |
| 2013/0091519 A1 | 4/2013 | McLauchlan et al. |
| 2013/0141530 A1 * | 6/2013 | Zavesky | H04N 21/234318 348/43 |
| 2013/0235154 A1 | 9/2013 | Salton-Morgenstern et al. |
| 2013/0339153 A1 | 12/2013 | Mishra et al. |

OTHER PUBLICATIONS

Chen et al., "PicToon: A Personalized Image-based Cartoon System," In Proceedings of the Tenth ACM International Conference on Multimedia (Juan-les-Pins, France, Dec. 1-6, 2002). Multimedia '02, ACM, New York, NY, pp. 171-178.

Medioni et al. "Real-time billboard substitution in a video stream." Multimedia Communications. Springer London, 1999, pp. 71-84.

* cited by examiner

Object A – 10 frames

Object B – 20 Frames

Area C – 30 Frames

Object A

Object B

| | Begin Frame | End Frame | Total Frames |
|---|---|---|---|
| Object A | 0 | 10 | 10 |
| Object B | 0 | 20 | 20 |
| Area A | 0 | 30 | 30 |

Change

METHOD OF IDENTIFYING AND REPLACING AN OBJECT OR AREA IN A DIGITAL IMAGE WITH ANOTHER OBJECT OR AREA

CROSS REFERENCE TO OTHER APPLICATIONS

This application claims priority to U.S. Provisional Patent Application No. 61/800,774 entitled METHOD OF IDENTIFYING AND REPLACING AN OBJECT OR AREA IN A DIGITAL IMAGE WITH ANOTHER OBJECT OR AREA, filed Mar. 15, 2013 which is incorporated herein by reference for all purposes.

BACKGROUND OF THE INVENTION

In a typical image or set of images, there are a variety of ways to identify certain objects and features by the human eye. It is more difficult to identify these same objects and features of an image in an automated fashion as there are multiple characteristics that need to be observed, identified, and tracked. By identifying an object, however, and all of the associated characteristics of that particular object, one can take a different object and replace the actual pixels that comprise all of the features and characters of the identified object with a different set of pixels that look like they belong in the original image such that they are indistinguishable by the human eye or other visual system. In each subsequent image in which the initial object is identified, the original object can be replaced with its modified features.

BRIEF DESCRIPTION OF THE DRAWINGS

Various embodiments of the invention are disclosed in the following detailed description and the accompanying drawings.

DETAILED DESCRIPTION

Figure 1:
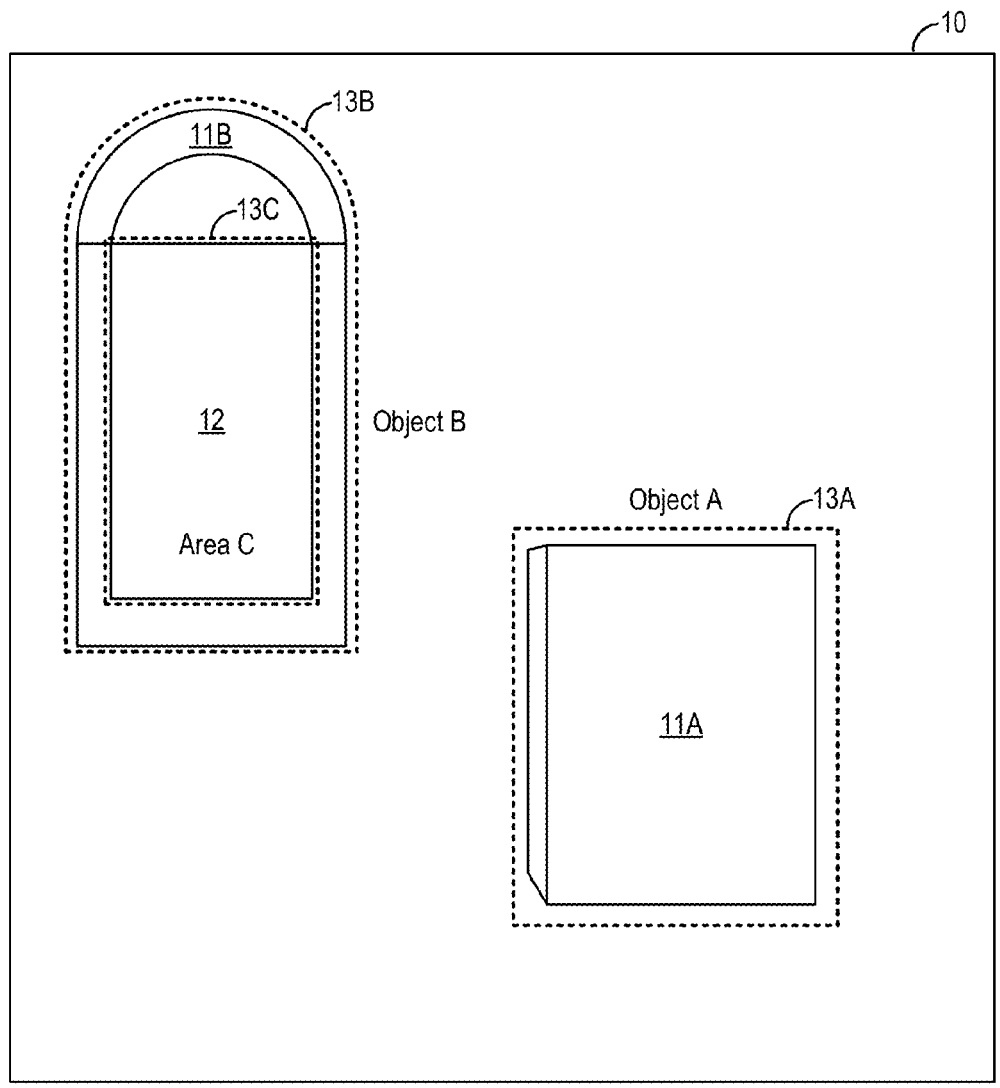
FIG. 1 shows an image with two objects and an area that have been automatically identified by the system and method in some embodiments of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present invention relates to a system and method for object and area detection and replacement in an image, and is particularly directed to a method of identifying an object or area in one or more sequential images that may form a moving image sequence and replacing some or all of the identified object or areas with another image such that the image looks to be part of the original composition of the original image including lighting, shadows, placement, occlusion, orientation, position, and deformation.

In some embodiments of the present invention, a system and method for identifying and tracking an object or all or a portion of an area in an image or a set of images is described. In some embodiments, the method is configured to identify an object or all or a part of an area in an image or a set of images, track the object or all of or a portion of an area across sequential images, and allow for replacement of that object or a portion of or all of an area with a replacement object such that the object or areas corresponding features such as lighting, shadows, placement, occlusion, orientation, position, and deformation are applied to the replacement object. In some examples, the method is used to allow a user to replace an identified object or area in an image or in a set of images with a logo or otherwise branded object such that the object would appear to have been there all along.

FIG. 1 shows an image with two objects and an area that have been automatically identified by the system and method in some embodiments of the present invention. Referring to FIG. 1, using the system and method in accordance with embodiments of the invention, an image 10 contains areas 12 and objects 11 that are automatically identified by using a database of previously identified objects and areas with similar characteristics including, but not limited to size, position, and identifiable text. The objects and areas in image 10 are automatically identified by using any number or combination of computer vision or feature detection methods, including, but not limited to, templating, blob detection, haar classifiers, SURF (Speeded Up Robust Features), FLANN (Fast Library for Approximate Nearest Neighbors). In the present example, Object A (11A) and Object B (11B) as well as Area C (12) have been automatically identified by comparing with the previously identified objects and areas. The identified objects 11A and 11B or the identified area 12 are presented or displayed to a user by methods such as, but not limited to, outlining the object or area or labeling the object with a text tag. In the present illustration, outlines 13A, 13B and 13C are used to visually display the identified objects 11A, 11B and identified area 12.

In the present description, the terms "an object," "an area," "a replacement object," or "a replacement area" all refer to a region of pixels in an image where the region of pixels includes a two-dimensional array of pixels and defines an image area that can have any shape, such as a polygon or a circle or an oval. The term "object" in an image is typically used to refer to a discrete, identifiable element in an image such as bottles, doors, tables, chairs, trees or other natural or man-made objects. An object may have different colors, sizes and other features as recognized in the scene such as shadows associated with the object. The term "area" in an image refers to an array of pixels in the image where the array of pixels may have similar characteristics, such as a part of a wall, a blank wall, a side of a building, or a window. Alternately, the term "area" may refer to an array of pixels that defines a sub-image, such as a logo or a label on an object or in the scene of the image. In embodiments of the present invention, the term "replacement object" or "replacement area" refers to a region of pixels applied to replace the pixels representing an object, part of the object, an area, or part of area. The "replacement object" or "replacement area" may sometimes be referred to as "a region of replacement pixels."

Figure 2:
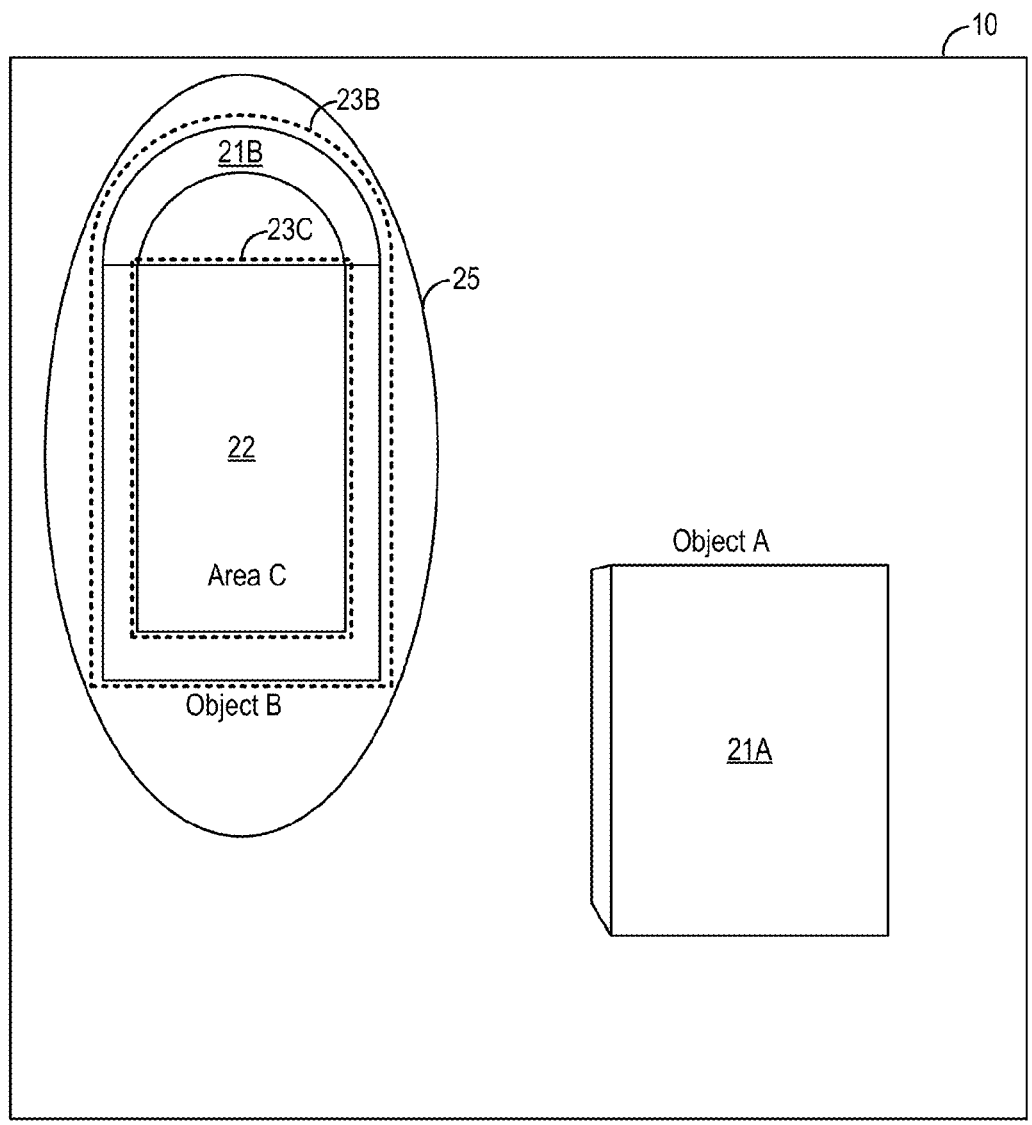
FIG. 2 shows an image in which a user has selected a selection area using an input device in order to narrow down for the system and method a selection area to automatically identify an object or area in some embodiments of the present invention.

In embodiments of the present invention, the system and method may be configured to search the entire image for identifiable objects and areas using the database of previously identified objects and areas with similar characteristics. In other embodiments, the system and method may be directed to search only a portion of the image for identifiable objects and areas. For example, a user may designate a selection area in which the system and method should search for identifiable objects and areas. FIG. 2 shows an image in which a user has selected a selection area using an input device in order to narrow down for the system and method a selection area to automatically identify an object or area in some embodiments of the present invention. In the example shown in FIG. 2, whether objects or areas are identified and displayed to a user or not, the user has the ability to select a selection area 25 by drawing around areas or objects that the user would like to use by using a mouse or other input based mechanism. Once the user has identified one or more regions of interest 25, the system and method of the present invention will then perform a more comprehensive automated search to identify objects or areas within the selection area 25.

With the region 25 being selected, the system and method of the present invention automatically identifies new objects and areas in region 25 by using any number or combination of computer vision and feature detection methods, including, but not limited to, templating, blob detection, haar classifiers, SURF (Speeded Up Robust Features), FLANN (Fast Library for Approximate Nearest Neighbors). In the present example, an identified object 21B or area 22 in region 25 are presented and displayed to the user by methods such as, but not limited to, outlining the object or area or labeling the object with a text tag. In the present illustration, outlines 23B and 23C are used to visually display the identified objects 21B and identified area 22.

In alternate embodiment of the present invention, the system and method of the present invention may identify objects and areas in the image where the identified objects and areas are used by the system to aid in the understanding of the scene shown in the image. For example, the system may identify trees and sky and may understand that the image contains an outdoor scene. With the scene of the image thus identified, the system may select a selection area 25 automatically for further searching of objects and area.

By selecting a selection area 25, the video tracking can more easily follow the object. As the selection area moves in subsequent images, area tracking can be performed on the selection area 25, and the selected region 25 can move as objects and areas move in subsequent images. The user can intentionally select regions that are easy to track as the object moves. In some embodiments, the system employs feature detection methods to track the selection areas or objects across several sequential images. For example, the system may create reference points to one or more detected features identified in each region for tracking the region or object in subsequent scenes. These reference points are then interpolated in subsequent frames such that traditional computer vision issues such as swimming or erratic movement of an identified feature are avoided. In some examples, feature detection methods FLANK or SURF are used to track the selection area and objects across multiple image frames. Open areas, areas which provide a good surface for insertion of images in a video, can also be automatically identified using known computer algorithms for pixel sampling and comparing like pixels. A selected region can be used to automatically identify areas to be tracked and allows images to be placed into a digital image or video with little or no user interaction. The video can be analyzed in the way described here and likely areas for image insertion can be automatically highlighted such that users can choose into which areas they want to insert images.

Figure 3:
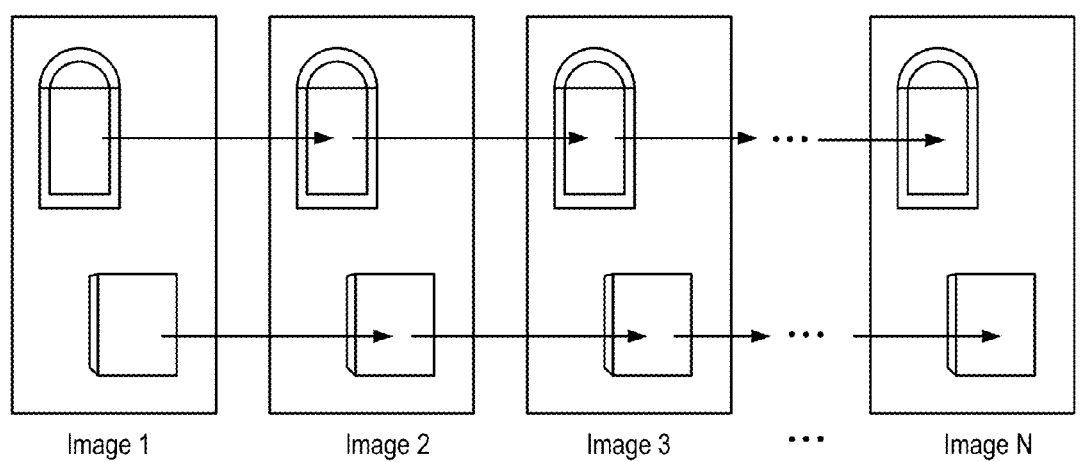
FIG. 3 shows multiple sequential images in which the system and method has automatically identified and tracked each object or area that it found in an initial image in some example of the present invention.

FIG. 3 shows multiple sequential images in which the system and method has automatically identified and tracked each object or area that it found in an initial image in some example of the present invention. Once a user has accepted the objects or areas that have been identified, or the system has automatically defined certain objects and areas, the system and method automatically tracks all of the identified objects and areas across some number N of sequential images using detected features in each image in the manner described above, as shown in FIG. 3.

Figure 4A:
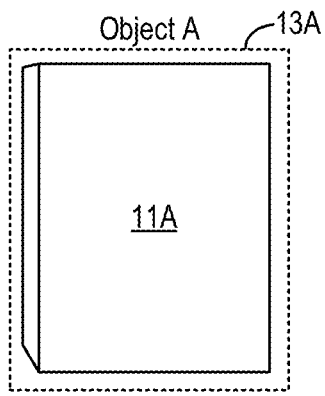
FIG. 4a shows three objects or areas that have been identified as well as the number of sequential images in which they have been found in some example of the present invention.
Figure 4A:
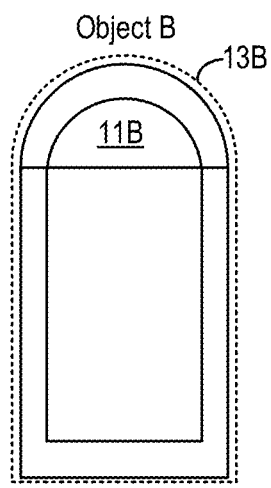
Figure 4A:
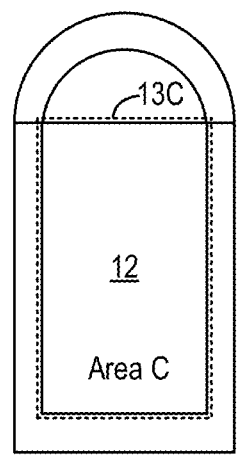

FIG. 4a shows three objects or areas that have been identified as well as the number of sequential images in which they have been found in some example of the present invention. After Object A, Object B and Area C are identified and accepted by the user, the user is shown the number of sequential images that each object and area appears in a given set of images. For example, the user is shown the objects 11A, 11B and area 12 that have been identified with the total number of frames they are available in.

Figure 4B:
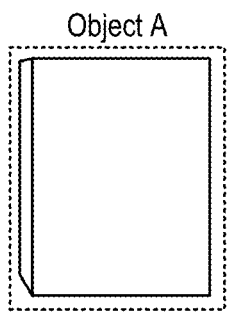
FIG. 4b shows three objects or areas that have been identified along with frame statistics relating to the identified objects and areas in some example of the present invention.
Figure 4B:
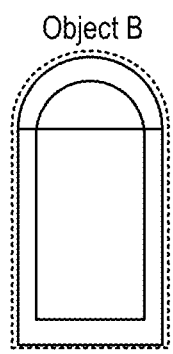
Figure 4B:
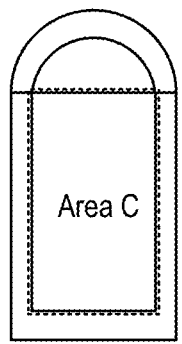

FIG. 4b shows three objects or areas that have been identified along with frame statistics relating to the identified objects and areas in some example of the present invention. Referring to FIG. 4b, the system and method may provide the user frame statistics such as the first frame the object or area appears in a sequence of images, the last frame the object or area appears in the same sequence of images, as well as the total number of image frames the object has been found in. In some embodiments, the user can change the first frame or the last frame for which the object or area should be identified.

In some embodiments, the user has the option to either remove an identified object or area of identification or change the numbered sequence of frames where the user would like the system to begin and end identifying each object or area. For example, the user is shown the objects and areas that have been identified with the start frame, end frame, and total number of frames, and given the option to change the start or end frame for each object or area.

Figure 5:
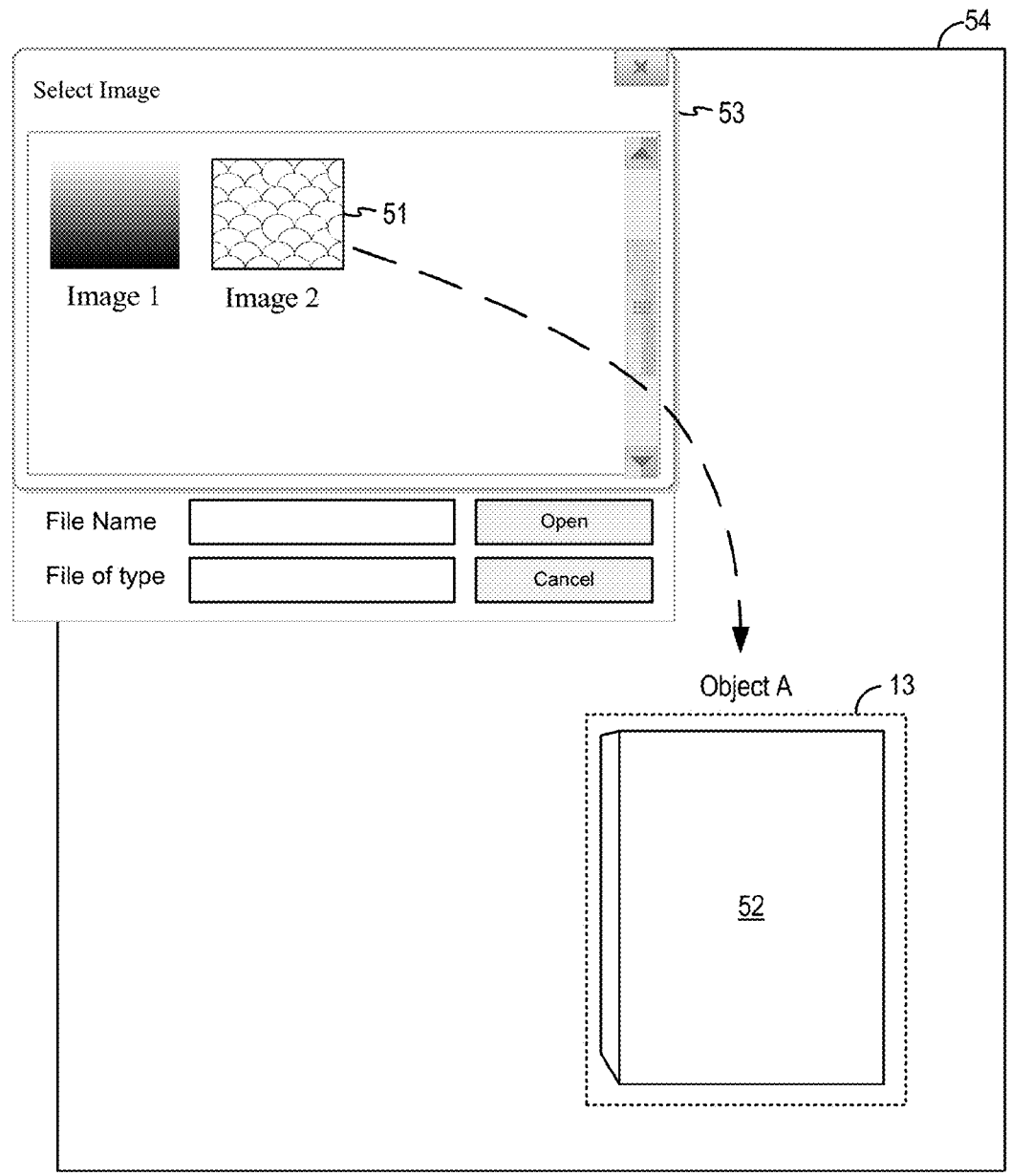
FIG. 5 shows a standard file dialog box with several images available for user selection in some example of the present invention.

FIG. 5 shows a standard file dialog box with several images available for user selection in some example of the present invention. In one embodiment of the invention, once areas and objects 52 have been identified by the user, the user can then select one of the identified objects using a mouse or other input method. Once the user has chosen an identified area or object, he can then choose to insert a new image or video from a file system into the identified area or object. For example, a file dialog box 53 may be presented to the user and the user may be presented with images Image 1 and Image 2. The user may select an image 51 and the image that the user has chosen is placed on the identified object or area 52.

Once the new image or video is chosen, the image 51 snaps to the size of the identified object or area 52, and the system and method makes adjustments such as lighting, shadows, placement, occlusion, orientation, position, and deformation, but not limited to, that have been previously identified to the inserted image.

Figure 6:
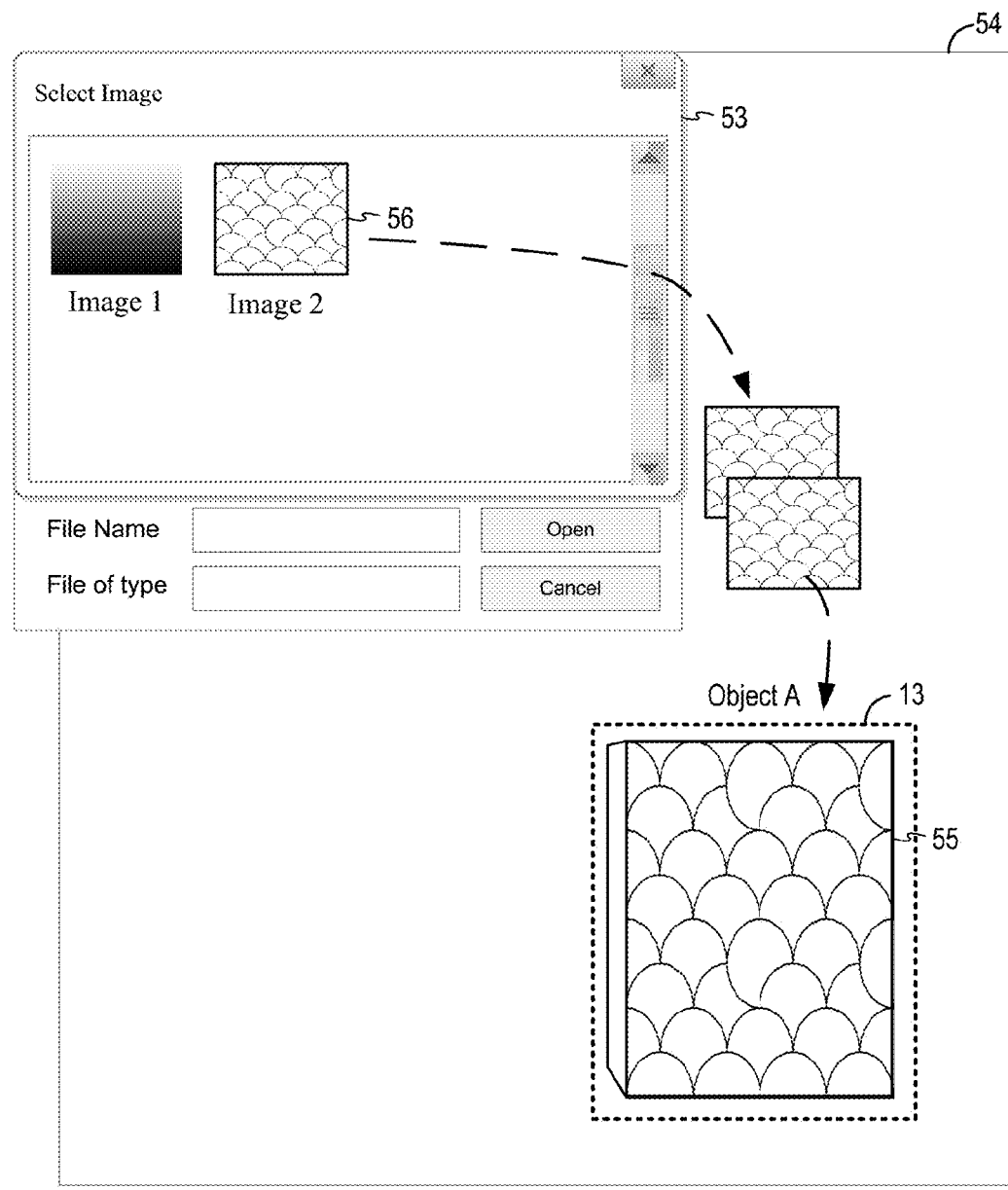
FIG. 6 shows the selection and insertion of an image selected from the standard file dialog box in another example of the present invention.

FIG. 6 shows the selection and insertion of an image selected from the standard file dialog box in another example of the present invention. In another embodiment of the invention, the user can choose an image or video 56 from the file system 53 and drag the image over the identified object or area for insertion. For example, the user has chosen an identified object or area 55 in an image 54. The user has also selected an image 56 for insertion into object or area 55. The user may drag the selected image 56 across the image 54 to the identified object or area 55. As the selected image 56 is being dragged across the image 54 and enters the identified object or area 55, the selected image 56 snaps to the size of the identified object or area 55. The system and method of the present invention then makes adjustments such as lighting, shadows, placement, occlusion, orientation, position, and deformation, but not limited to, that have been previously identified to the inserted image.

In yet another embodiment of the present invention, information exists concerning a current user such as, but not limited to, geo-location, likes and dislikes, favorite brands, and favorite foods of the user. The information tied to an individual user using the system may be stored in a database. Based on this user-specific information, the system and method of the present invention may replace identified objects or areas in an image with images stored on a file system that have been tagged to correspond to the user-specific information. As an example, a user who has been identified to be in a particular zip code can be shown a business logo in that particular zip code on an identified object or area if an image exists that is tied to that zip code. If no such image is available, a default image could be substituted.

In still yet another embodiment of the present invention, the user may choose from a selection of three-dimensional objects and insert the 3-D objects into the identified area. Alternately, the system may select from a selection of three-dimensional objects based on information relating to the user preference and insert the 3-D objects into the identified area. After the system and method of the present invention automatically adds features such as, but not limited to, lighting, shadows, placement, occlusion, orientation, position, and deformation to the selected three-dimensional object, the user can choose to additionally modify the three-dimensional object by using things such as, but not limited to, lighting, shadows, placement, occlusion, orientation, position, and deformation. Any modifications made to the three-dimensional object are stored in a database or data file and can later be used to construct the three-dimensional object for every sequential image.

Figure 7A:
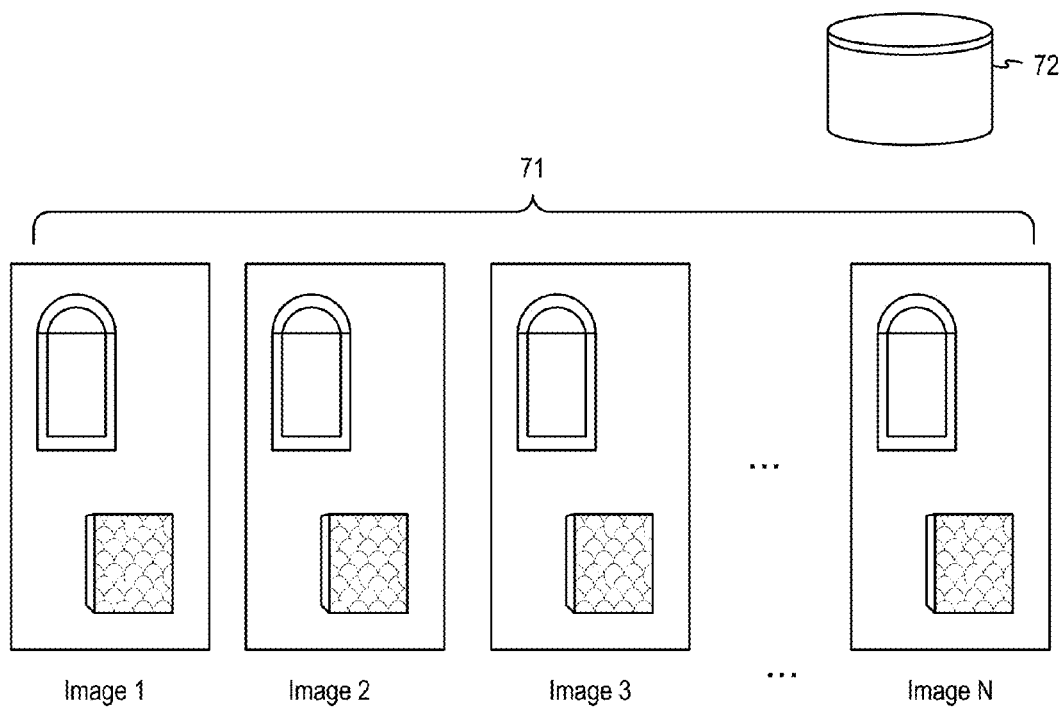
FIG. 7a shows a single set of sequential images that have been rendered with all replaced objects and areas and a corresponding data file to store information about how to reconstruct the image sequence in some example of the present invention.

FIG. 7a shows a single set of sequential images that have been rendered with all replaced objects and areas and a corresponding data file to store information about how to reconstruct the image sequence in some example of the present invention. In one embodiment of the present invention, once a new image or video has been inserted into the original image and accepted by a user, a new set of sequential images 71 can then be rendered with all of the replaced objects or areas tracked across subsequent sequential images to form a movie or video such that it appears that the replaced object or area is part of the original set of sequential images. The tracking of the replaced objects and areas in multiple sequential images can be carried out using feature detection techniques in the manner described above. The new set of sequential images 71 can then be played back using any normal movie or video playback methods. Information about the modified objects or areas can be stored in a data file 72 that allows for reconstruction of the modified image.

Figure 7B:
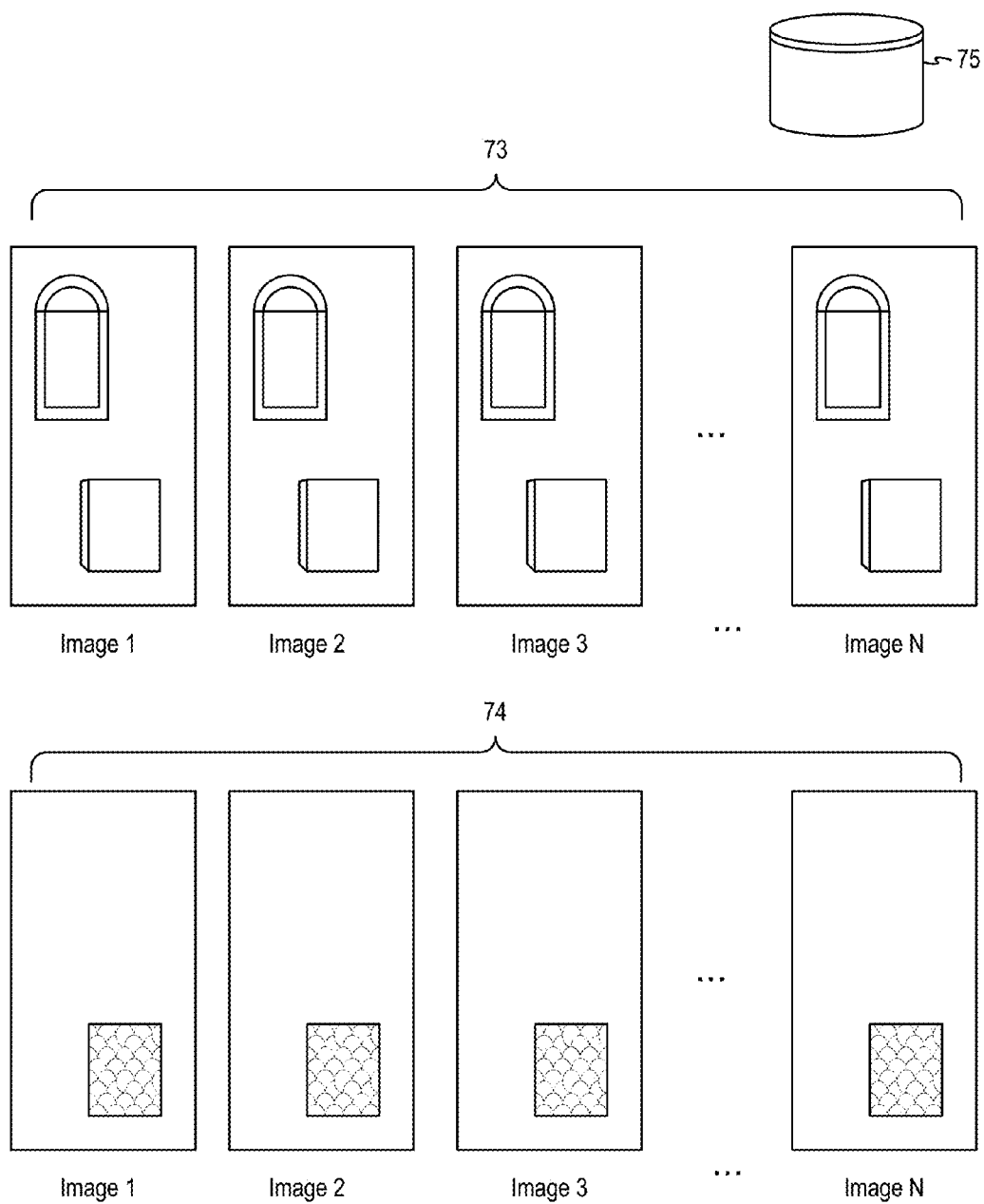
FIG. 7b shows multiple sets of sequential images that have been split out and rendered with all replaced objects and areas in their own image sequence and a corresponding data file to store information about how to reconstruct the image sequences in some example of the present invention.

FIG. 7b shows multiple sets of sequential images that have been split out and rendered with all replaced objects and areas in their own image sequence and a corresponding data file to store information about how to reconstruct the image sequences in some example of the present invention. In another embodiment of the present invention, once new images or videos have been inserted into the original image and accepted by a user, N number of new sets of sequential images can then be rendered with each inserted object or area forming its own sequential set of images 74, along with the original set of images 73. The canvas size for the sequential images 74 is set to the canvas size of the original image, with the canvas's alpha channel being set to transparent where the inserted image does not occupy any area in the overall canvas, including if the inserted image had an original alpha channel incorporated. The two or more sets of sequential images 73, 74 can then be described by additional information on how to arrange each set of images with the original set of images. This information can be stored in a data file 75 that allows for reconstruction of the modified image.

Figure 8:
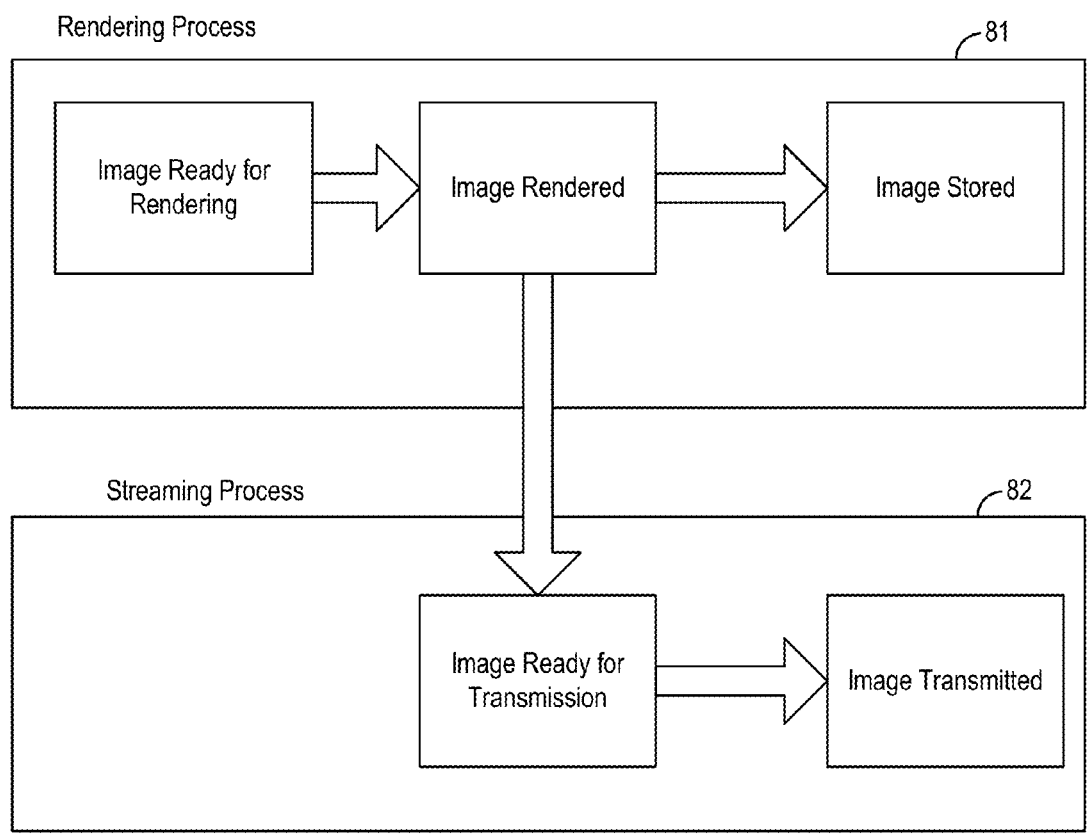
FIG. 8 shows a process where a part of an image sequence can be transmitted across a network while other images are still being rendered in some example of the present invention.

FIG. 8 shows a process where a part of an image sequence can be transmitted across a network while other images are still being rendered in some example. In one embodiment of the present invention, the system and method implements a rendering process 81 that is used to generate a single set of images in which all of the inserted images and the original images are rendered into a single set of new images. Alternately, in other embodiments, the rendering process 81 may be used to generate two sets of images in which the inserted images are rendered separately from the original set of images. The set of original images and the set of inserted images are composited for display to yield images that are equivalent to a single set of images incorporating the inserted images.

The image being rendered is available to be transmitted through a transmission or streaming process 82 locally or remotely across a data network, such as the Internet or a mobile network. Alternately, the image being rendered may be transmitted through terrestrial or cable television broadcast. The information that describes the newly rendered image or set of images is also available to be transmitted. Specifically, the entire set of sequential images does not need to be rendered first, prior to allowing for a single sequential image to be transmitted or streamed using the streaming process 82.

In one embodiment of the present invention, once a set of images and information is received at the streaming process 82, the streaming process 82 may reconstruct the images to create a standard movie file, such as an MP4 file. The movie file may be streamed or transmitted to display devices for viewing. As described above, the movie file may contain one set of sequential images incorporating the inserted images. The single movie file can thus be viewed or played on its own. Alternately, in other embodiments, separate movie files can be created for the original images and for the inserted images. The separate movie files can be viewed by compositing the multiple movie files using the information associated with the movie files so that the movies files are presented as if they are a single movie file.

In one embodiment of the present invention, the system and method of the present invention maintains a system of searching for a single image to allow for searching based on a description of the image. The description of the images can be supplied by the image owner, as will be described below with reference to FIG. 9.

In another embodiment of the present invention, the system and method of the present invention maintains a system of searching for a single image to allow for searching based on a description or meta-data of the image. The description of the images can be determined by automatic detection of the identifiable objects contained within the image.

In another embodiment of the present invention, the system and method of the present invention maintains a system of searching for a single image to allow for searching based on a description of the image. The description of the images can be determined by spoken word within the audio track of the image.

In another embodiment of the present invention, the system and method of the present invention maintains an analytics component for all sets of images received, tracking the number of times that the set of images has been presented for potential replacement.

In another embodiment of the present invention, the system and method of the present invention maintains an analytics component for all sets of images received, tracking the number of times that the set of images has been presented as a result of searching for the image based on a keyword or tag search. The tags may be provided by the owner of the video or may be derived through other automated means, including but not limited to audio recognition patterns, as will be described below with reference to FIG. 10. Keywords may also be derived based on automated video analysis, including but not limited to, object detection within the image using lighting and orientation information.

In another embodiment of the present invention, the system and method of the present invention maintains an analytics component for all sets of images received, tracking the number of times that the set of images has been presented as a result of searching based on the identification of the owner of the original image.

In one embodiment of the present invention, the system and method of the present invention maintains an analytics component to track the frequency of presentation for videos that have had objects replaced with other objects.

In another embodiment of the present invention, the system and method of the present invention maintains an analytics component to track the frequency of presentation for videos that may be selected to have objects replaced with other objects.

In another embodiment of the present invention, the system and method of the present invention maintains an analytics component to track the frequency of presentation of videos to an individual viewer.

In another embodiment of the present invention, the system and method of the present invention maintains an analytics component to track the frequency of presentation of videos within defined geographic regions.

In another embodiment of the present invention, the system and method of the present invention maintains an analytics component to track the time of presentation of videos to an individual viewer. In other embodiments, the system and method of the present invention maintains an analytics component to track the time in a video when a replacement image has been inserted. Furthermore, in other embodiments, the system and method of the present invention maintains an analytics component to track whether a user has actually watched the video segment with the inserted image.

In another embodiment of the present invention, the system and method of the present invention maintains an analytics component to track the format of the destination player.

Users of the system are given access to review statistics on all images placed within the system, whether used for dynamic replacement or is the target of replacement. Users can tag any image placed with keywords describing the content of the image. Additionally, any audio track added to the system is scanned for keywords and added to the inventory of search criteria based on frequency of word use within the audio track as well as other factors.

In one embodiment of the present invention, the system and method provides a user portal to enable content producers to upload videos containing areas or objects that can have their content replaced. Additionally, the user portal allows the owner of content to identify himself as the owner of a collection of images containing areas or objects that can have their content replaced.

Figure 9:
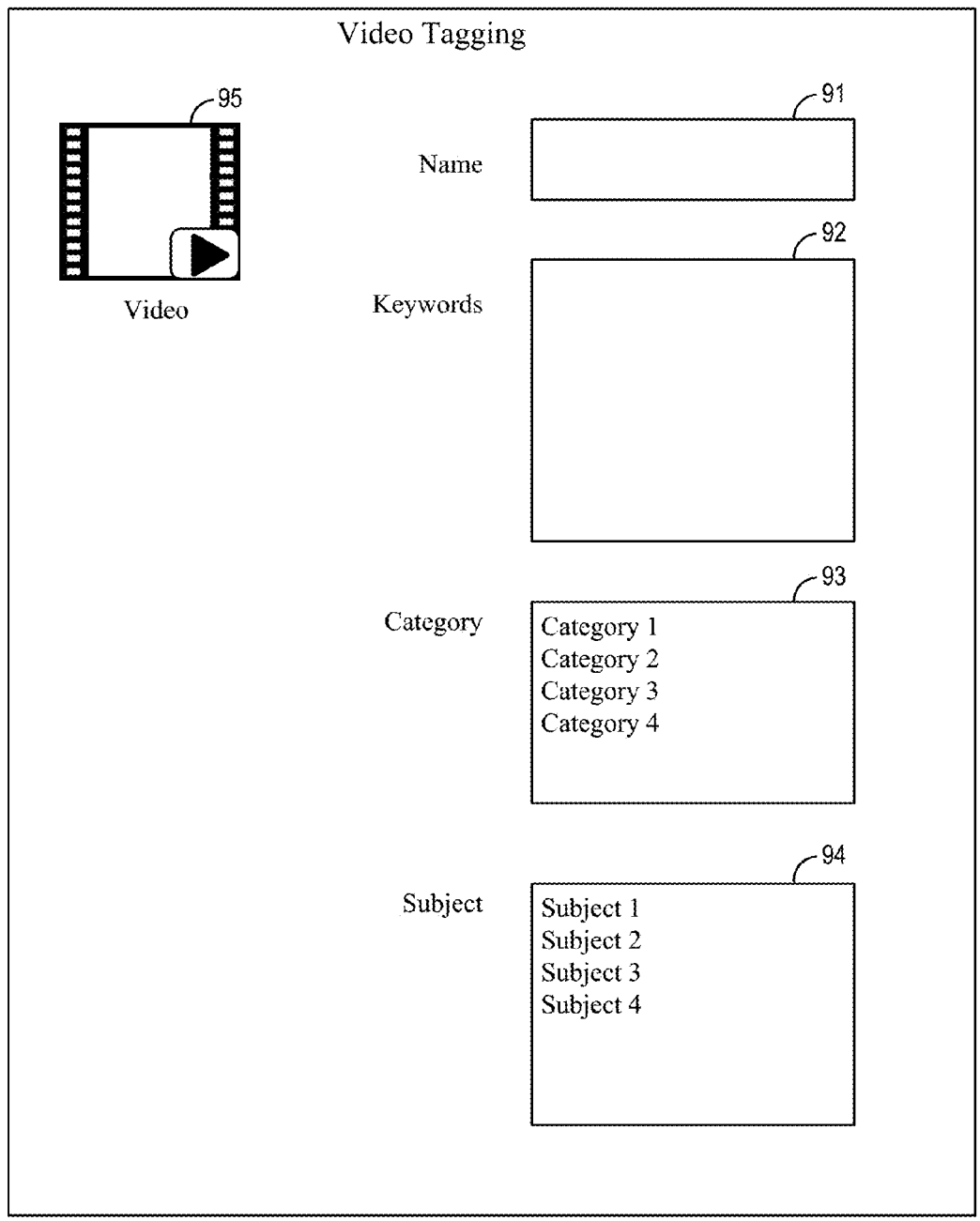
FIG. 9 shows an exemplary user portal for tagging a video file with keywords in some embodiments of the present invention.

In another embodiment of the present invention, the system and method provides a user portal to enable a content owner to enter a synopsis of the video uploaded. For example, the content owner is able to enter standard search terms ("keywords") that applies to the video provided. FIG. 9 shows an exemplary user portal for tagging a video file with keywords in some embodiments of the present invention. In the example shown in FIG. 9, the owner of a video 95 may upload the video to the system. The owner can enter a name (91) for the video and keywords (92) describing the video 95. In another embodiment of the present invention, the user portal may enable the content owner to select a category (93) and subject (94) from a predefined list of categories and subjects for the uploaded video.

In another embodiment of the present invention, a user portal allows the content owner to select an automatic detection of object names and/or types to be added as standard search terms ("keywords") to the video provided. A system of object and edge detection of the video segment of the moving image is used to perform the automatic detection. At the conclusion of the analysis, the content owner is presented with a listing of objects found, and can approve or deny inclusion of the names of such objects into the keyword set for the video.

Figure 10:
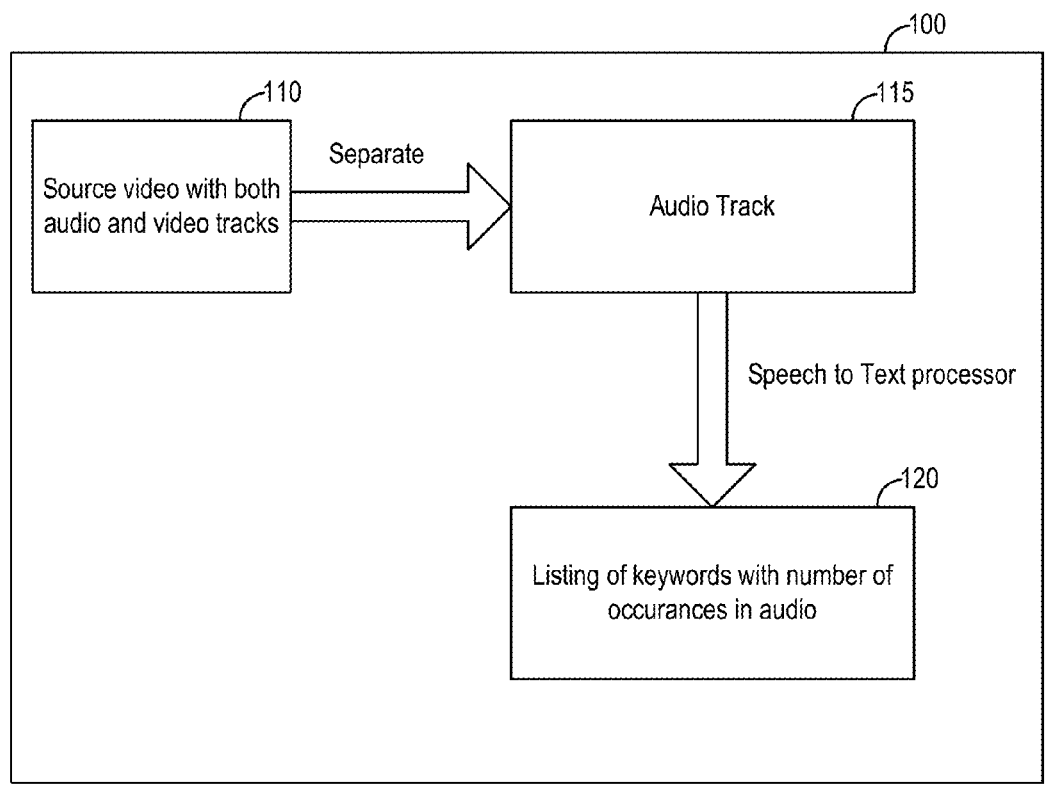
FIG. 10 shows an exemplary process implementation for deriving keywords from an audio track of a selected video in some example of the present invention.

FIG. 10 shows an exemplary process implementation for deriving keywords from an audio track of a selected video in some example of the present invention. In some embodiments, the system and method of the present invention provides a user portal to enable a content owner to select an automatic analysis of any dialogue provided as part of the video (i.e. dialog in the audio track) to be added as standard search terms ("keywords") to the video. A system 100 for speech to text recognition is used to analyze the dialog of the video. The source video 110 with both audio and video tracks is provided to the system 100. The audio track 115 is separated from the video track. The resulting audio track 115 is provided to a speech-to-text processor to scan for significant, recognized words. The speech-to-text processor generates a listing of keywords 120. In some embodiments, the speech-to-text processor generates the listing of significant words with the frequency that each word occurred in the audio track 115. The keywords may be selected based on, but not limited to, frequency of use, inflection or volume of the pronounced words. At the conclusion of the analysis, the content owner is presented with a listing of keywords 120 found and can approve or deny inclusion of such words into the keyword set for the video.

In another embodiment of the present invention, results of the above video and audio analysis are aggregated over all videos provided, and commonly occurring objects, areas, or dialog may be tracked.

In another embodiment of the present invention, the system and method provides a user portal to allow content consumers the ability to search for any videos containing areas or objects that can have its content replaced. The consumer may search on any of the following properties of source videos: subjects, categories within subjects, keywords, video format, source video resolution, video duration, defined replaceable objects available within source videos. There may be additional search parameters defined and available to the consumer. This user portal allows the content consumer to identify himself as a consumer of such a collection of images.

In another embodiment of the present invention, the system and method provides a user portal to allow content consumers the ability to upload images (either still or moving images) that can be replaced into videos. Furthermore the consumer can give each uploaded image an identifier for later analytic use. The consumer may select a category and subject for his uploaded content.

Figure 11:
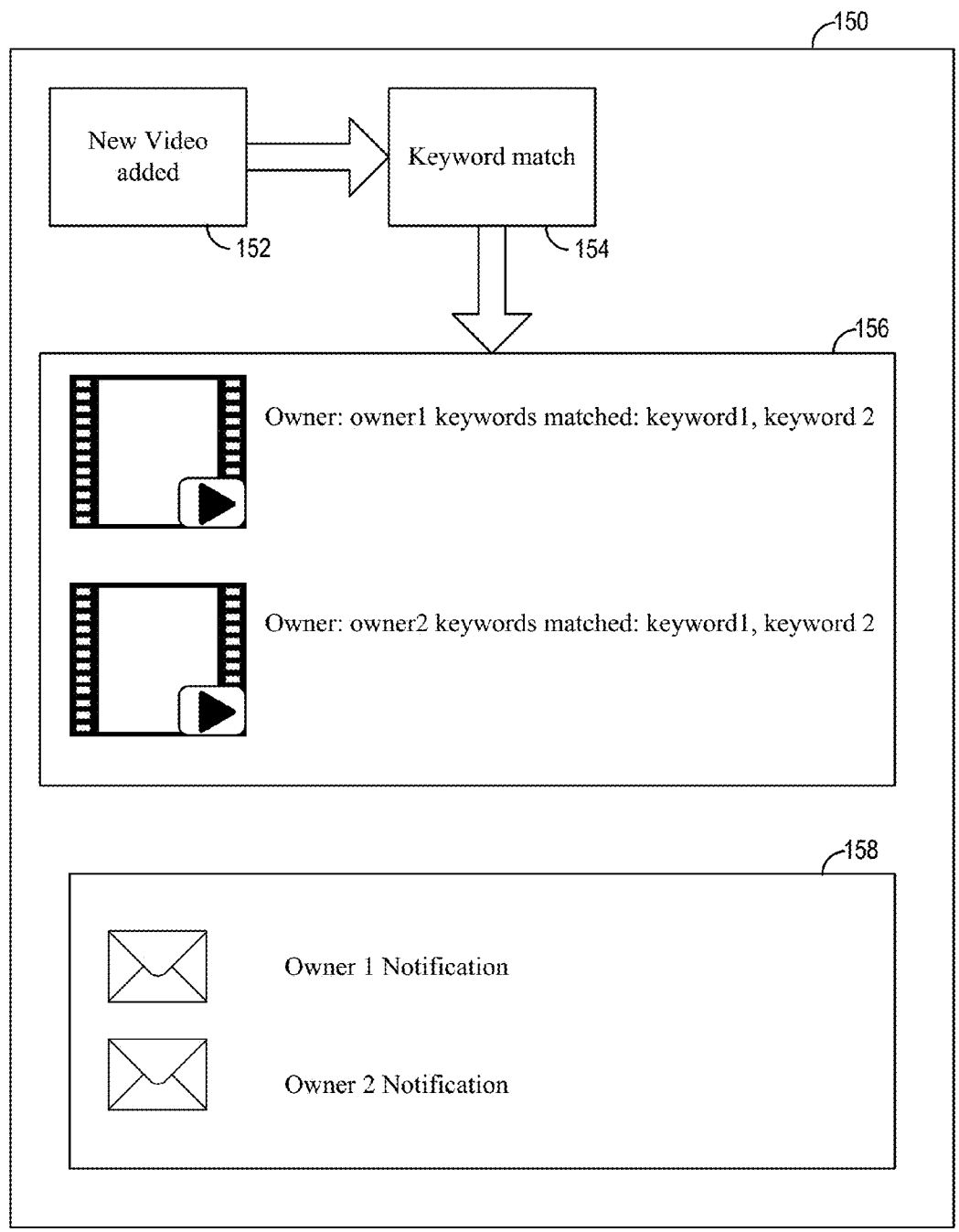
FIG. 11 shows an exemplary implementation of notification processing after a new video has been uploaded in some example of the present invention.

In another embodiment of the present invention, the system and method provides an unattended process to periodically notify consumers when new source videos have been added that are likely matches for their product. The matching can be performed based on keyword matches between consumer uploaded images and source videos. FIG. 11 shows an exemplary implementation of notification processing after a new video has been uploaded in some example of the present invention. The process 150 receives newly uploaded videos 152. The keywords attached to the newly received video asset are compared to keywords attached to replaceable video or still image segments (154). If a match occurs, notification 158 is sent to the owner of the replaceable video segment.

In another embodiment of the present invention, the system and method provides an unattended process to periodically notify consumers when new source videos have been added that are likely matches for their product, based on similarity between attributes or keywords of new source videos and attributes or keywords of source videos that have previously been sought for, or matched with, the consumers' images.

In some embodiments, the user may select specific objects or areas and provide the system and method approximate distances of those objects or areas to the camera. By selecting key background points and foreground points and with knowledge of the distance of those objects given by the user, the system can determine the camera and its movement in 3-dimensional space. The user may also approximate any obvious lighting directions and provide the lighting direction information to the system. This allows the system to replace objects and create accurate lighting by using the given lighting directions and 3-dimensional space determined by user input. In other embodiments, the system and method of the present invention may be configured to extract distance information from the image itself. For example, the system may analyze the image after identifying all objects, areas, and associated information such as terrain and shadows, and based on this information, create an overall light map containing the direction of light and the strength of light in the image. From the light map information and previously identified occlusion, shadow, and other information about each object and area, the system detects the depth of the objects or areas and determine the overall lighting condition in the scene and how the lighting condition affects each object and area. In addition, a light map can be created for each individual object or area.

In accordance with one aspect of the present invention, a method is described for automated identification of a set of pixels in a computer generated image or images that includes an identifiable object or area and its corresponding features such as lighting, shadows, placement, occlusion, orientation, position, and deformation.

In accordance with another aspect of the present invention, a method is described for providing identification of these objects and areas to a user by visually or auditorily outlining or tagging the object or area with an identifiable marker that may prompt a user to accept the object or area as an identifiable object across a number of sequential images.

In accordance with another aspect of the present invention, a method is described for automatically tracking this object across a number of sequential images and allowing a user to stop identifying this object or area after a certain image number. Alternately, the method may be configured to stop tracking an object or area in the sequential images after the object or area is no longer found in a given number of sequential images.

In accordance with another aspect of the present invention, a method is described for a user to take a different computer generated image and drag the image into a previously identified and tracked area.

In accordance with another aspect of the present invention, a method is described for replacing the identified object and its characteristics pixels in the identified area and adjust the pixels of the new image such that it matches features such as, but not limited to, lighting, shadows, placement, occlusion, orientation, position, and deformation, of the original identified object or area such that the human eye or another vision system will be unable to identify the new object or area as not having been in the original image.

In accordance with another aspect of the present invention, a method is described for allowing for a user to choose different images or movie files to be incorporated into an area.

In accordance with another aspect of the present invention, a method is described for automatically inserting images into an object or area by using information such as, but not limited to, geo-location, likes and dislikes, favorite brands, and favorite foods of a user.

In accordance with another aspect of the present invention, a method is described for converting a 2-dimensional image that can be situated on a xy axis into a 3-dimensional image with a xyz axis and in which identifiable occlusion, depth, lighting, and other information that is typically representative of a 3-dimensional image can be extracted.

In accordance with another aspect of the present invention, a method is described for inserting a 3-dimensional object into the new 3-dimensional representation and attaching lights and shadows such that when viewed as a 2-dimensional image, the features of the 3-dimensional object are indistinguishable as being separate from the image.

In accordance with another aspect of the present invention, a method is described to combine a process that allows a set of sequential images to be individually manipulated on an image by image basis, and to be streamed across a local or public internet or mobile network immediately after an image is manipulated.

In accordance with another aspect of the present invention, a method is described to allow N number of sets of composited sequential images to be transmitted or streamed across a local or public data network, such as the Internet or a mobile network, such that they are received as a single set of composited images with information about each set of sequential images as to how the single set can be split back out into the original set of n number of sets of sequential images. Additional information can be associated with each set of sequential images that describe any objects or areas identified in each image along with peripheral information such as websites or product definitions for branding or advertising.

In accordance with another aspect of the present invention, an interface is described for allowing an image or a set of sequential images to be viewed such that during the display of each image, objects or areas identified in each image that have additional information associated with it are displayed to the viewer over each object or area identified.

In accordance with another aspect of the present invention, an interface is described for allowing N number of sets of images or N number of sets of sequential images to be viewed such that during the display of each image, objects or areas identified in each image of each set of images that have additional information associated with it are displayed to the viewer over each object or area identified.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of identifying and replacing a region of pixels in each image of a series of sequential images, the method comprising:
    accessing, using a processor, a database of previously identified objects or areas, the previously identified objects or areas being discrete, identifiable elements of images that are naturally occurring in the images, each of the previously identified objects or areas being represented as a two-dimensional array of pixels in the images;
    searching, using the processor, within at least a portion of a first image of the series of sequential images for identifiable objects or areas by comparing with the previously identified objects or areas from the database, the identifiable objects or areas being discrete, identifiable elements of the first image that are naturally occurring in the first image;
    identifying, using the processor, a first region of pixels in the first image of the series of sequential images as an identified object or area by comparing with the previously identified objects or areas from the database, the first region of pixels being identified using a two-dimensional array of pixels in the first image;
    identifying, using the processor, the first region of pixels and one or more features associated with the first region of pixels in a first subset of images in the series of sequential images using a two-dimensional array of pixels in each of the first subset of images;
    selecting, using the processor, a second region of pixels to replace the first region of pixels, the second region of pixels being represented as a two-dimensional array of pixels in the image;
    adjusting, using the processor, one or more features of the second region of pixels based on information derived from the one or more features of the first region of pixels in each of the first subset of images, the one or more features of the second region of pixels being adjusted so that the second region of pixels, when substituted in for the first region of pixels, appears to be part of the original composition of the series of sequential images;
    inserting, using the processor, the second region of pixels represented as a two-dimensional array of pixels in each of the first subset of images to replace the first region of pixels; and
    rendering, using the processor, at least one new image of the series of sequential images including the second region of pixels replacing the first region of pixels in the first subset of images.

2. The method of claim 1, further comprising:
    adjusting, using the processor, a size of the second region of pixels based on the size of the first region of pixels in each of the first subset of images.

3. The method of claim 1, wherein searching, using the processor, within at least a portion of a first image of the series of sequential images for identifiable objects or areas by comparing with the previously identified objects or areas from the database and identifying, using the processor, a first region of pixels in the first image of the series of sequential images as an identified object or area by comparing with the previously identified objects or areas from the database comprise:
   automatically searching and identifying the first region of pixels in the first image using computer vision methods and using the previously identified objects or areas from the database.

4. The method of claim 1, wherein searching, using the processor, within at least a portion of a first image of the series of sequential images for identifiable objects or areas by comparing with the previously identified objects or areas from the database and identifying, using the processor, a first region of pixels in the first image of the series of sequential images as an identified object or area by comparing with the previously identified objects or areas from the database comprise:
   automatically searching and identifying the first region of pixels in the first image by performing correlation with the previously identified objects or areas from the database.

5. The method of claim 1, wherein identifying, using the processor, a first region of pixels in the first image of the series of sequential images as an identified object or area by comparing with the previously identified objects or areas from the database comprises:
   identifying an object in the first image or an area of the first image as the first region of pixels.

6. The method of claim 1, wherein searching, using the processor, within at least a portion of a first image of the series of sequential images for identifiable objects or areas by comparing with the previously identified objects or areas from the database and identifying, using the processor, a first region of pixels in the first image of the series of sequential images as an identified object or area by comparing with the previously identified objects or areas from the database comprise:
   selecting a selection area in the first image; and
   automatically searching and identifying the first region of pixels in the first image by searching within the selection area.

7. The method of claim 6, wherein selecting a selection area in the first image comprises:
   selecting a selection area in the first image based on objects or areas already identified in the first image.

8. The method of claim 6, wherein selecting a selection area in the first image comprises:
   receiving a user input identifying the selection area.

9. The method of claim 1, wherein adjusting, using the processor, one or more features of the second region of pixels based on information derived from the one or more features of the first region of pixels in each of the first subset of images comprises:
   adjusting one or more features of the second region of pixels, the one or more features including lighting, shadows, placement, occlusion, orientation, position or deformation.

10. The method of claim 1, wherein adjusting, using the processor, one or more features of the second region of pixels based on information derived from the one or more features of the first region of pixels in each of the first subset of images comprises:
   converting a two dimensional image of a first object or area defined by the first region of pixels into a three dimensional image of the first object or area; and
   extracting one of occlusion, depth or lighting information of the first object or area using the three dimensional image.

11. The method of claim 1, further comprising:
   transmitting the at least one new image over a data network while continuing to render new images of the series of sequential images including the second region of pixels.

12. The method of claim 1, wherein rendering at least one new image of the series of sequential images including the second region of pixels in the first subset of images comprises:
   generating a series of new sequential images being the series of sequential images with the second region of pixels replacing the first region of pixels in each of the first subset of images.

13. The method of claim 1, wherein the series of sequential images comprises a series of original sequential images and rendering at least one new image of the series of sequential images including the second region of pixels in the first subset of images comprises:
   generating a set of new sequential images corresponding to the first subset of images, each image of the set of new sequential images including the second region of pixels and being transparent where the second region of pixels does not occupy any area in the new sequential image; and
   generating information describing arrangement of the set of new sequential images with the series of original sequential images.

14. The method of claim 13, further comprising:
   transmitting at least one image from the series of original sequential images and one image of the set of new sequential images over a data network while continuing to render new images in the set of original sequential images and the set of new sequential images.

15. The method of claim 1, wherein the second region of pixels comprises a replacement object or area and selecting a second region of pixels to replace the first region of pixels comprises:
   automatically selecting a replacement object or area using information relating to a user.

16. The method of claim 15, wherein automatically selecting a replacement object or area using information relating to a user comprises:
   automatically selecting a replacement object or area using information relating to the user, the information including at least one of the geographic locations of the user, the likes and dislikes of the user, the favorite brands of the user, and the favorite foods of the user.

17. The method of claim 1, further comprising:
   automatically selecting the first image from the series of sequential images in response to the detection of the first object or area in the first image.

18. The method of claim 1, further comprising:
   automatically selecting the first image from the series of sequential images in response to the detection of one or more predetermined spoken words in an audio track associated with the first image.

19. The method of claim 1, further comprising:
   tagging one or more images of the series of sequential images using one or more keywords; and automatically selecting the first image from the series of sequential images in response to the detection of one or more predetermined keywords tagged with the first image.

20. A system for identifying and replacing an object or area in a series of sequential images, comprising:
a processor; and
a memory coupled with the processor, wherein the memory is configured to provide the processor with instructions which when executed cause the processor to:
  access a database of previously identified objects or areas, the previously identified objects or areas being discrete, identifiable elements of images that are naturally occurring in the images, each of the previously identified objects or areas being represented as a two-dimensional array of pixels in the images;
  search within at least a portion of a first image of the series of sequential images for identifiable objects or areas by comparing with the previously identified objects or areas from the database, the identifiable objects or areas being discrete, identifiable elements of the first image that are naturally occurring in the first image;
  identify a first region of pixels in the first image of the series of sequential images as an identified object or area by comparing with the previously identified objects or areas from the database, the first region of pixels being identified using a two-dimensional array of pixels in the first image;
  identify the first region of pixels and one or more features associated with the first region of pixels in a first subset of images in the series of sequential images using a two-dimensional array of pixels in each of the first subset of images;
  select a second region of pixels to replace the first region of pixels, the second region of pixels being represented as a two-dimensional array of pixels in the image;
  adjust one or more features of the second region of pixels based on information derived from the one or more features of the first region of pixels in each of the first subset of images, the one or more features of the second region of pixels being adjusted so that the second region of pixels, when substituted in for the first region of pixels, appears to be part of the original composition of the series of sequential images;
  insert the second region of pixels represented as a two-dimensional array of pixels in each of the first subset of images to replace the first region of pixels; and
  render at least one new image of the series of sequential images including the second region of pixels replacing the first region of pixels in the first subset of images.

21. The system recited in claim 20, wherein the memory is further configured to provide the processor with instructions which when executed cause the processor to:
  automatically select a replacement object or area as the second region of pixels using information relating to the user, the information including at least one of the geographic locations of the user, the likes and dislikes of the user, the favorite brands of the user, and the favorite foods of the user.

22. A computer program product for identifying and replacing an object in a series of sequential images, the computer program product being embodied in a tangible and non-transitory computer readable storage medium and comprising computer instructions for:
  providing a database of previously identified objects or areas, the previously identified objects or areas being discrete, identifiable elements of images that are naturally occurring in the images, each of the previously identified objects or areas being represented as a two-dimensional array of pixels in the images;
  searching, using the processor, within at least a portion of a first image of the series of sequential images for identifiable objects or areas by comparing with the previously identified objects or areas from the database, the identifiable objects or areas being discrete, identifiable elements of the first image that are naturally occurring in the first image;
  identifying a first region of pixels in the first image of the series of sequential images as an identified object or area by comparing with the previously identified objects or areas from the database, the first region of pixels being identified using a two-dimensional array of pixels in the first image;
  identifying and tracking the first region of pixels and one or more features associated with the first region of pixels in a first subset of images in the series of sequential images using a two-dimensional array of pixels in each of the first subset of images;
  selecting a second region of pixels to replace the first region of pixel, the second region of pixels being represented as a two-dimensional array of pixels in the image;
  adjusting one or more features of the second region of pixels based on information derived from the one or more features of the first region of pixels in each of the first subset of images, the one or more features of the second region of pixels being adjusted so that the second region of pixels, when substituted in for the first region of pixels, appears to be part of the original composition of the series of sequential images;
  inserting the second region of pixels represented as a two-dimensional array of pixels in each of the first subset of images to replace the first region of pixels; and
  rendering at least one new image of the series of sequential images including the second region of pixels replacing the first region of pixels in the first subset of images.

23. The computer program product recited in claim 22, further comprising computer instructions for:
  automatically selecting a replacement object or area as the second region of pixels using information relating to a user, the information including at least one of the geographic locations of the user, the likes and dislikes of the user, the favorite brands of the user, and the favorite foods of the user.

24. A method of identifying and replacing a region of pixels in a first image comprising:
  accessing, using a processor, a database of previously identified objects or areas, the previously identified objects or areas being discrete, identifiable elements of images that are naturally occurring in the images, each of the previously identified objects or areas being represented as a two-dimensional array of pixels in the images;
  searching, using the processor, within at least a portion of a first image of the series of sequential images for identifiable objects or areas by comparing with the previously identified objects or areas from the database, the identifiable objects or areas being discrete, identifiable elements of the first image that are naturally occurring in the first image;

identifying, using the processor, a first region of pixels in the first image as an identified object or area by comparing with the previously identified objects or areas from the database, the first region of pixels being identified using a two-dimensional array of pixels in the image;

identifying, using the processor, the first region of pixels and one or more features associated with the first region of pixels in the first image using a two-dimensional array of pixels in the first image;

selecting, using the processor, a second region of pixels to replace the first region of pixels, the second region of pixels being represented as a two-dimensional array of pixels in the image;

adjusting, using the processor, one or more features of the second region of pixels based on information derived from the one or more features of the first region of pixels in the first image, the one or more features of the second region of pixels being adjusted so that the second region of pixels, when substituted in for the first region of pixels, appears to be part of the original composition of the first image;

inserting, using the processor, the second region of pixels represented as a two-dimensional array of pixels in the first image to replace the first region of pixels; and rendering, using the processor, a second image based on the first image and including the second region of pixels replacing the first region of pixels.

* * * * *